May 7, 1940.   J. B. P. H. GALLE   2,199,819
AERIAL NAVIGATION MEANS
Filed July 23, 1937
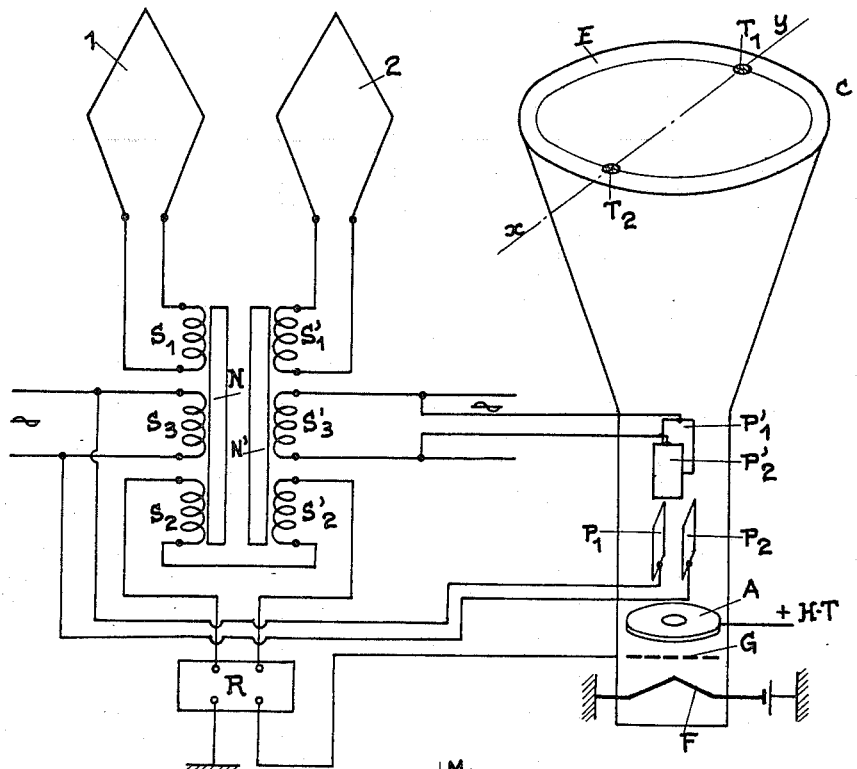
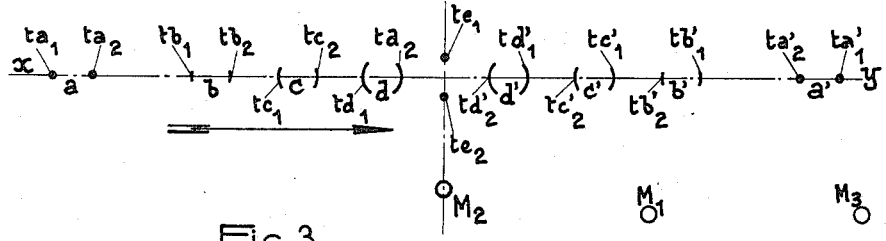
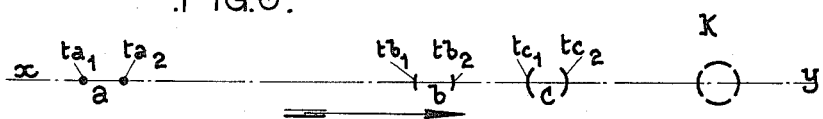
Jean, Baptiste Paul Henri GALLE
INVENTOR
BY: Haseltine Lake & Co.
ATTORNEYS.

Patented May 7, 1940

2,199,819

UNITED STATES PATENT OFFICE 2,199,819

AERIAL NAVIGATION MEANS

Jean Baptiste Paul Henri Galle, Sceaux, France, assignor to Société Anonyme: Jaeger-Aviation, Levallois-Perret (Seine), France Application July 23, 1937, Serial No. 155,175
In Belgium July 29, 1936

3 Claims. (Cl. 250—11)

This invention relates to a method of navigation particularly applicable to aerial navigation means.

For determining the position of a movable object, it has already been proposed to arrange, on board this movable object, a receiving system for radioelectric waves and a radiocompass combined with said receiving system, in such a manner that said radiocompass can cause several signals to simultaneously appear, which signals must indicate the various bearings of several emitting stations. The applicant has found that, in devices of this kind, it is practically very difficult to distinguish one from the other the bearing indicating signals and that, particularly in the case of a radiocompass having a cathode ray tube and of two emitting stations only, the luminous spots are in fact united one to the other for forming a luminous arc, the angular opening of this arc being obviously a function of the angle the apex of which is on the movable object and the sides of which pass through the emitting stations. This circumstance constitutes an obstacle to the exact determination of the position of the movable object relatively to the emitting stations; but the present invention has for object to make use of the same for ensuring a radioelectric marking out of routes or grounds, which is quite a different problem from the determination of the position of a movable object.

The invention utilises also a radioelectric receiving device of the radiocompass type giving visual signals and several emitting stations; but the invention is characterised by the fact that each marked out zone is formed by at least two emitting stations arranged on either side of the route to be traced at a relatively small distance in order that at the limit of the range, the indications of the radiocompass should not differ from those it would give if only one station existed.

According to the preferred form of construction, the radiocompass is of the cathode ray tube type, causing to appear, at a great distance from the emitting stations, a luminous spot or two luminous spots diametrally opposed indicating the direction of these stations, said spots lengthening in proportion as the movable object draws near the stations for forming one or more arcs the angular opening of which gives an approximation of the distance separating the movable object from said stations, the continuity of the variations of the geometrical figure formed by this arc or these arcs being interrupted at the time the marking out zones are crossed.

The present invention further relates to a number of particular features which will appear from the following description with reference to the accompanying drawing, given by way of example only, in which:

Fig. 1 is a diagrammatic view of a form of construction of a radiocompass with a cathode ray tube arranged on board the movable object to be directed, for acting in a manner known per se as indicating device.

Fig. 2 diagrammatically illustrates the various shapes and positions taken by the luminous tracings appearing on the screen of the cathode ray tube when the movable object moves forward between two emitting stations.

Fig. 3 is a view similar to Fig. 2 when the movable object moves forward towards four emitting stations arranged at the corners of a rectangle for marking out the location of a landing ground for instance.

The radiocompass shown by Figure 1 comprises two perpendicular loops 1 and 2 which are respectively connected to the ends of identical self-induction coils $S_1$ and $S'_1$. Two identical self-induction coils $S_2$ and $S'_2$ are respectively coupled to the self-induction coils $S_1$ and $S'_1$ through the medium of high frequency iron cores N and N' and these self-induction coils $S_2$ and $S'_2$ are connected in series to the input circuit of a radioelectric receiver R. The currents, generated in $S_2$ and $S'_2$ from currents induced in the loops 1 and 2 by the incident wave, are modulated by the self-induction coils $S_3$ and $S'_3$ respectively mounted on the cores N and N' and fed by alternating currents out of phase to the extent of 90°.

The cathode ray tube comprises, in the known manner, a suitably heated filament F, a grid G controlled by the output circuit of the receiver R and suitably polarized, at least one anode A raised to a high positive voltage, two pairs of plates $P_1$, $P_2$ and $P'_1$, $P'_2$ at right angles to each other and respectively fed by two voltages in phase with those feeding the self-induction coils $S_3$ and $S'_3$, respectively. The cathode ray tube moreover comprises a fluorescent screen E on which the cathodic beam deflected by the groups of plates $P_1$, $P_2$ and $P'_1$, $P'_2$, traces a Lissajou circle C in the case under consideration. The luminous intensity of this circle can be rendered very small for instance, or zero, by negatively polarizing the grid G, whilst the appearance of the maxima of the signals, received by the loops 1 and 2 and transmitted, after modulating, to the grid G in order to positively polarize this grid, will cause to appear at two points $T_1$ and $T_2$ diametrically opposed on the circle C, two very luminous tracings which will give the azimuth of the incident wave.

In fact in the particular case of this radiocompass, the rotation of the usual goniometrical loop is replaced by a fictitious rotation obtained by modulating high frequency currents F issuing from the perpendicular loops 1 and 2. For that purpose, these currents are respectively transmitted by the two self-induction coils $S_1$ and $S'_1$ to the two self-induction coils $S_2$ and $S'_2$ arranged in series in the input circuit of the radioelectric receiver R; but the coupling between $S_1$ and $S_2$ on the one hand, and between $S'_1$ and $S'_2$ on the other hand, is rendered variable and modulated at a frequency $f$ by means of the self-induction coils $S_3$ and $S'_3$. The current feeding $S_3$ has the same frequency $f$ as the current feeding $S'_3$, but these two currents are out of phase to the extent of 90°.

In these conditions, the two currents of frequency F received in the self-induction coils $S_2$ and $S'_2$ will be modulated to frequency $f$, but the maximum modulations to frequency $f$ will be displaced by 90° relatively to each other, and the value of these maximum modulations will depend on the currents passing through $S_1$ and $S'_1$ respectively. It results therefrom that the superposition of the two currents of frequency F modulated to frequency $f$, issuing from $S_2$ and $S'_2$, will finally give a current of frequency F modulated to frequency $f$, and the maximum of which will be determined in amplitude and in phase by the relative values of the currents induced in the aerials 1 and 2; the phase of this final current is therefore determined by the azimuth of the incident wave. Consequently, if this current is amplified, then detected in order to maintain only the modulation to frequency $f$, the phase difference between this modulation and any one of the modulating currents passing through $S_3$ or $S'_3$ gives an angular value of the incidence of the radioelectric wave.

In the cathode ray tube E, the two pairs of plates $P_1$—$P_2$ and $P'_1$—$P'_2$ are subjected to two two-phase voltages of same frequency $f$ feeding the self-induction coils $S_3$ and $S'_3$. The spot of the cathode ray tube therefore traces a Lissajou circle. But, as explained, the grid G receives the sinusoidal voltage of frequency $f$ issuing from the receiver R, which voltage is superposed on the negative voltage polarizing the grid G. If this negative voltage has been adjusted to a value such that the grid G is positive for the maximum currents of frequency $f$ issuing from the receiver R, and if it is remembered that the voltages of the deflecting plates are two-phase voltages and of frequency $f$, it will be seen that on the screen are obtained two luminous spots diametrally opposed, since there are two maximum currents per period.

It is obvious that the embodiment which has just been described for the radiocompass and the cathode ray tube has been given by way of example only in order to facilitate the comprehension of the marking out method according to the invention, and that it is not in any way limitative.

Some examples of the marking out method according to the invention will now be described in detail.

In Fig. 2, it has been assumed that the movable object must, in order to follow its route $xy$, pass in a characteristic zone K. For that purpose and according to the invention, on either side of the zone K are arranged two emitters $M_1$ and $M_2$, preferably nondirectional emitters, situated on a line at right angles to the route $xy$. These two emitters $M_1$, $M_2$, which can also be of the directed wave type, are set on the same wave length and emit any identical signals, such as pure continuous waves, modulated continuous waves or telephonic waves. These various modes of emission can be alternated during the displacement of the movable object, such as an aircraft, without affecting the operation of the device.

It is then found that, when the movable object is very far from K and for instance at $a$, both stations $M_1$ and $M_2$ act as a single emitter owing to the fact that the distance $M_1 M_2$ is negligible relatively to the distance $Ka$. From this fact, the bearing given by the radiocompass and which appears, in the example given above, on the screen E of the cathode ray tube is constituted by two points $ta_1$ and $ta_2$ diametrally opposed and giving the direction of the line $xy$, that is to say the direction of the zone K. When the distance separating the movable object from the zone K diminishes and becomes of the order of the distance $M_1 M_2$ separating the emitters, the latter can then no longer be considered as acting in fact as a single emitter and, thereby, the luminous traces, appearing on the screen E of the cathode ray tube, are no longer spots but arcs of circle diametrally opposed and the length of which increases in proportion as the movable object comes nearer to K, as is shown at $tb_1$ and $tb_2$, $tc_1$ and $tc_2$, $td_1$ and $td_2$ when the movable object is respectively at $b$, $c$, and $d$ on the route $xy$. The pilot of the movable object will thus have at every instant an indication concerning the distance separating him from the zone K.

When the movable object is at $e$ that is to say in the zone K between the stations $M_1$ and $M_2$, the luminous tracings $te_1$ and $te_2$ which appear on the screen E are then constituted by two brilliant spots diametrally opposed and aligned according to line $M_1 M_2$, that is to say at right angles to the route $xy$, and this indicates to the pilot that he passes above the characteristic zone K.

As soon as the movable object has passed beyond this zone K, the luminous traces appearing on the screen E are the same as those which appeared before the passage of the movable object over this zone K and they have been indicated at $td'_1$ and $td'_2$, $tc'_1$ and $tc'_2$, $tb'_1$ and $tb'_2$, $ta'_1$ and $ta'_2$.

The pilot of the movable object has thus, at every instant, both the direction of zone K and, when he is in the vicinity of this zone K, an approximate indication of the distance separating him therefrom.

In Fig. 3, it has been assumed that the emitting stations are four in number and surround at $M_1$, $M_2$, $M_3$ and $M_4$ a zone such as a landing ground above which the aircraft must pass or on which it must land after having followed a route $xy$ passing between the stations $M_1$ and $M_2$ and $M_3$ and $M_4$. These stations all emit on the same wave length any signals and it will be seen that, as in the case of Fig. 2, when the aircraft is very far away, the four stations can be considered as acting as a single emitter, so that the bearing, given by the radiocompass and which appears, in the example chosen, on the screen E of the cathode ray tube, is constituted by two diametrally opposed pots $ta_1$, $ta_2$ giving the direction of the line $xy$, that is to say the direction of the zone K surrounded by the stations $M_1$, $M_2$, $M_3$ and $M_4$. When the distance separating the movable object from the zone K diminishes and becomes of the order of the distance separating the emitting stations from each other, these stations can no longer be considered as acting as a single station and, from this fact, the luminous traces appearing on the screen E are no longer spots, but arcs of circle diametrally opposed according to $xy$ and the length of which increases in proportion as the movable object comes nearer to the zone K, as is shown at $tb_1$ and $tb_2$, $tc_1$ and $tc_2$ when the movable object or aircraft is respectively at $b$ and $c$.

When the movable object is above the zone K, that is to say between the stations $M_1$, $M_2$, $M_3$ and $M_4$, these four stations each cause two diametrally oposed luminous traces to appear on the screen E and these traces, in the shape of arcs of circle, join each other for forming a luminous circle on the screen E indicating thereby to the pilot that he is above the zone K marked out by the stations $M_1$, $M_2$, $M_3$ and $M_4$.

It will be understood that the examples of Figs. 1 and 2 are not in any way limitative and that the emitting stations might be arranged in any suitable manner for ensuring the marking out of the route to be followed and of the various characteristic points or zones of the latter, such as: locations of landing grounds, high points of the route, etc. The condition to fulfill consists in that, in every case, the shape, dimension and arrangement of the luminous signals appearing on the screen of the cathode ray tube combined with the receiver placed on the movable object to be directed, vary according to the position of this movable object relatively to said characteristic points or zones of the route thus marked out.

What I claim as my invention and desire to secure by Letters Patent is:

1. Apparatus for determining the position of a movable craft with respect to a group of spaced stations located at predetermined points on either side along the path of travel of said craft, comprising radioelectric transmitters individually disposed at said stations and a radioelectric receiving device upon said craft, including a pair of similar self-induction coils, a pair of spaced receiving loops individually connected to said coils, two high frequency iron cores in said coils, two additional self-induction coils individually coupled inductively to the first mentioned coils by means of said iron cores, a radioelectric receiver having the input circuit thereof connected in series with said additional coils, modulating means individually associated in fixed relation with said cores and adapted to have alternating currents fed thereto so as to be out of phase with respect to each other, and a cathodic oscillograph having an anode at high positive potential, a heated filament, a grid connected to the output of said receiver, two pairs of spaced plates arranged with one pair rotated 90° with respect to the plates of the other pair, one pair being connected to one modulating means and the other connected to the other modulating means, and a fluorescent screen receiving a cathodic beam as deflected by said plates.

2. Apparatus according to claim 1, wherein the modulating means include two further self induction coils individually mounted on the cores, one coil having the ends thereof connected individually to the plates of one pair and the other coil having the ends similarly connected to the other pair of plates, and one pair of plates is disposed above the other pair.

3. Apparatus according to claim 1, wherein the modulating means include two further self induction coils individually mounted on the cores, between the first and additional coils thereon, one coil having the ends thereof connected individually to the plates of one pair and the other coil having the ends similarly connected to the other pair of plates, and one pair of plates is disposed above the other pair.

JEAN BAPTISTE PAUL HENRI GALLE.